US006564191B1

United States Patent
Reddy

(12) United States Patent
(10) Patent No.: US 6,564,191 B1
(45) Date of Patent: May 13, 2003

(54) COMPUTER-IMPLEMENTED METHOD FOR PERFORMANCE MEASUREMENT CONSISTENT WITH AN INVESTMENT STRATEGY

(76) Inventor: Visveshwar N Reddy, 16 Salem Rd., Woodbridge, CT (US) 06525

(*) Notice: Subject to any disclaimer, the term of this patent is extended or adjusted under 35 U.S.C. 154(b) by 0 days.

(21) Appl. No.: 09/513,280

(22) Filed: Feb. 24, 2000

(51) Int. Cl.⁷ .............................................. G06F 17/60
(52) U.S. Cl. .......................................... 705/36; 705/10
(58) Field of Search .............................. 705/36, 37, 26, 705/38, 10, 7, 35, 64

(56) References Cited

U.S. PATENT DOCUMENTS

| | | | | |
|---|---|---|---|---|
| 5,812,988 A | * | 9/1998 | Sandretto | 705/36 |
| 6,289,321 B1 | * | 9/2001 | Suganuma | 705/36 |
| 6,360,210 B1 | * | 3/2002 | Wallman | 705/36 |

FOREIGN PATENT DOCUMENTS

JP 406068103 A * 3/1994

OTHER PUBLICATIONS

IEEE "Measuring investment sucess"; Shumate, C.M.; Aug. 1985; pp. 1 and 3.*
"Share Builder" Internet Home Page, Please Review http://www.sharebuilder.com, Which Claims to be a Flexible and Affordable Way to Invest in the Stock Market by Making Automatic Periodic Investments in Company Stock and Index Stocks.

* cited by examiner

Primary Examiner—Pierre E. Elisca
(74) Attorney, Agent, or Firm—Raj Jaipershad

(57) ABSTRACT

A computer-implemented method and system for analyzing performance of financial securities consistent with a long-term investment strategy, the method utilizing a computer system for inputting investment parameters pertaining to a security of interest and interactively utilizing the computer to calculate an internal rate of return for the security and outputting investment and performance information comprising market value of said investment, time-weighted internal rate of return of said investment, cumulative investment amount and cumulative number of shares of security purchased at the end of a specified time period.

10 Claims, 11 Drawing Sheets

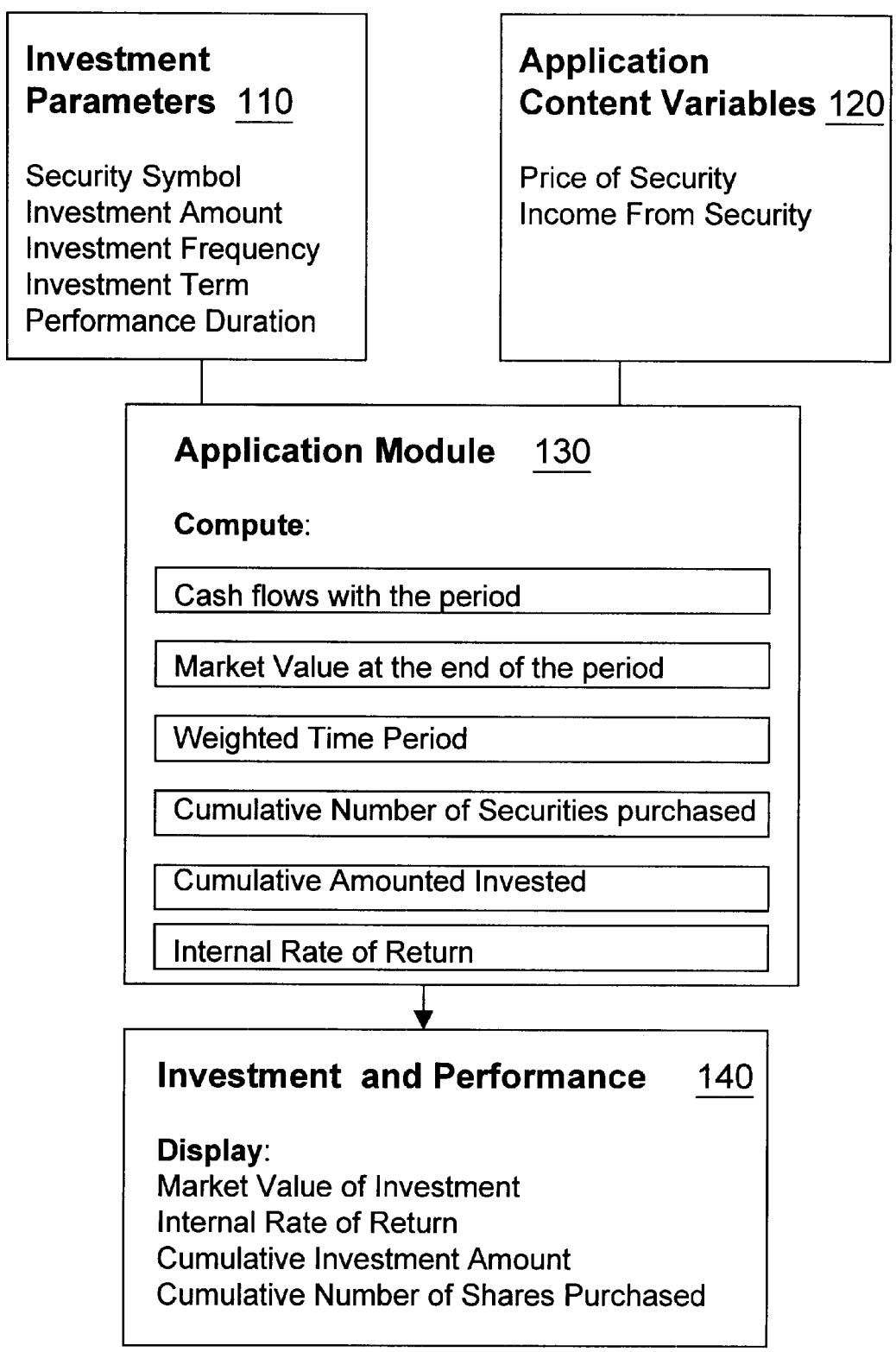

Fig. 2

Individual Security Analysis

⊙ Ticker Symbol
○ Security Name

[ABC]   [GO]

Investment Amount

Initial Investment:  500
Periodic Investment:  500
Reinvest Dividends(Y/N):  Y

Investment Term

Start Date:  12/30/98
End Date:  12/30/99

Performance Duration

Start Date:  12/30/98
End Date:  12/30/99

Investment Frequency

○ Yearly
⊙ Quarterly
○ Monthly
○ Bi-Weekly
○ Weekly
○ Daily

Investment and Performance Results: ABC Corporation
From: 12/30/98    To: 12/30/99

Investments

Cumulative Amount Invested:  2,500.00
Cumulative Number of
Securities Purchased:  115.75

Performance

Market Value of Investment:  3,067.00

Internal Rate of Return:  47.63%

[SUBMIT]  [RESET]

Fig. 4

Portfolio Analysis

| Ticker | Investment Term | | Initial Investment | Periodic Investment | Investment Frequency | Dividend Reinvestment | Performance Duration | | Cumulative Amount Invested | Market Value | IRR% |
|---|---|---|---|---|---|---|---|---|---|---|---|
| | Start Date | End Date | | | | | Start Date | End Date | | | |
| ABC | 12/30/1995 | 11/30/1996 | $150.00 | $150.00 | M | Y | 12/30/1995 | 11/30/1999 | $2,034.00 | $2,805.00 | 15.7% |
| PQR | 12/30/1995 | 11/30/1999 | $150.00 | $150.00 | M | Y | 12/30/1995 | 11/30/1999 | $7,280.00 | $12,814.00 | 31.0% |
| XYZ | 12/30/1995 | 11/30/1999 | $150.00 | $150.00 | M | Y | 12/30/1995 | 11/30/1999 | $7,343.00 | $20,250.00 | 58.1% |
| | | | | | | Total | 12/30/1995 | 11/30/1999 | $16,657.00 | $35,869.00 | 40.1% |

Fig. 5　← 500

Investment Parameters 510
Security Symbol, Investment Amount
Investment Frequency, Investment Term
Performance Duration, Investment Adjustment Factor

Application Content Variables 520
Price of Security
Income From Security
200-Day Moving Average Compare Price 530
on Investment
date to 200 day
Moving average Cash flows with the period 560
Market Value at the end of the period
Weighted Time Period
Cumulative Number of Securities purchased
Cumulative Amounted Invested
Internal Rate of Return Adjusted Periodic 540
Investment
Amount Cash flows with the period 550
Market Value at the end of the period
Weighted Time Period
Cumulative Number of Securities purchased
Cumulative Amounted Invested
Internal Rate of Return

Investment and Performance 570
Moving Average Strategy: 571
Market Value of Investment
Internal Rate of Return
Cumulative Investment Amount
Cumulative Number of Shares Purchased
Moving Average Strategy: 572
Market Value of Investment
Internal Rate of Return
Cumulative Investment Amount
Cumulative Number of Shares Purchased

Fig. 6

Investment Parameters 610
Security Symbol, Investment Frequency
Investment Term, Performance Duration
Market Value

Application Content Variables 620
Price of Security
Income From Security

Compute market value by investment frequency    630
Compute total number of shares required to reach market value
Compute cumulative number of shares on hand Determine number of securities to be    640
bought or sold to reach investment target:
Total Number of Shares Required-Number of shares on hand.

Determine Investment Amount or    650
Amount to withdrawn: Number
of shares to be bought or sold * Price/Security Cash flows with the period    660
Market Value at the end of the period
Weighted Time Period
Internal Rate of Return

Investment and Performance 670
Market Value of Investment
Internal Rate of Return
Cumulative Investment Amount
Cumulative Number of Shares Purchased

Fig. 7 ← 700

Investment Parameters 710
Security Symbol, Investment Amount
Investment Frequency, Investment Term
Performance Duration

Application Content Variables 720
Price of Security
Income From Security

Cash flows with the period 730
Market Value at the end of the period
Weighted Time Period
Cumulative Number of Securities purchased
Cumulative Amounted Invested
Internal Rate of Return Display Editable Invest Parameters and 740
Application Content Variables

Investment and Performance 750
Market Value of Investment
Internal Rate of Return
Cumulative Investment Amount
Cumulative Number of Shares Purchased Accept Results 760 — NO
YES
End

Fig. 8

Modeling and Forecasting

| | Ticker | Date | Price | Amount | Frequency | Shares | Cumulative Investment | Market Value |
|---|---|---|---|---|---|---|---|---|
| | | | Investment | | | | | |
| 1 | ABC | 12/30/98 | 17.90 | 500.00 | Q | 27.93 | 500.00 | 500.00 |
| 2 | ABC | 03/30/99 | 18.75 | 500.00 | Q | 26.67 | 1000.00 | 1024.00 |
| 3 | ABC | 06/30/99 | 21.73 | 500.00 | Q | 23.01 | 1500.00 | 1686.00 |
| 4 | ABC | 09/30/99 | 25.94 | 500.00 | Q | 19.28 | 2000.00 | 2513.00 |
| 5 | ABC | 12/30/99 | 26.50 | 500.00 | Q | 18.87 | 2500.00 | 3067.00 |

Internal Rate of Return: 47.63%

[What if?] [Reset to Original Data] [Add to Portfolio]

COMPUTER-IMPLEMENTED METHOD FOR PERFORMANCE MEASUREMENT CONSISTENT WITH AN INVESTMENT STRATEGY

FIELD OF INVENTION

The present invention relates to a computer-implemented method and system for analyzing the performance of financial securities consistent with a long-term investment strategy. In particular, the present invention relates to a computer-implemented investment analysis tool adapted for use with a dollar cost averaging (DCA) strategy wherein an investor invests in a financial security over a period of time to realize the value of compounding and to achieve a financial goal, while reducing the risk associated with putting a lump-sum investment in the market at the wrong time. The present method as implemented on a computer system, includes the Internet, and allows for ordinary inventors to easily access the invention and use it for personalized investment analysis consistent with their investment strategy.

BACKGROUND

Financial advisors and mutual fund prospectuses often cite a DCA strategy for use by investors to invests in securities over a period of time, so as to realize the value of compounding and reduce risk, as the best way to build wealth in the long run. The strategy is widely followed by millions of investors who make contributions to their company sponsored retirement plans at regular intervals; by individual investors trying to accumulate wealth over a period of time with modest investment and to leverage the value of compounding; and by investors who prefer to spread out their investments over a period of time, rather than making a lump sum investment at one time, to reduce risk.

Like other investors, these investors while recognizing that past performance does not guarantee future results, they nevertheless rely on past performance statistics, to a varying degree, in making investment decisions, or to model their portfolios, or to track their portfolio performance and or to set financial goals.

In the prior art, usually the past performance statistics can be seen in the form of price-trend charts that shows, for example, percentage rates of return in a financial security that was held for a certain time period; or a hypothetical graph that shows the market value of a one-time investment in a financial security held for a specified period of time.

Price-trend charts typically show a split-adjusted price of the stock over a period of time ranging from a few days to several years. While price-trend charts are useful to indicate the general price-trend of securities, the information they provide is lacking in depth and, consequently by themselves, these price-trend chart information is not a reliable indicator of financial performance.

Similarly, rates of return indicators for a security are typically presented in the form of rates of return on the security held for a period of time such as a one, three, five or ten year time period, or a rate of return for the life of the security. While these rate of return charts are useful for indicating average rates of return, they do not provide sufficient insight into the market value of investments, which for many is the ultimate goal for measuring wealth.

A hypothetical graph showing the market value of a one-time investment in a financial security held for a specified period of time may dramatically depict the market value of a one-time investment. However, this information is of limited use to an investor whose investments pattern and amounts may differ from the hypothetical investment amount, and who is making several purchases of the security over time.

As a result, an investor interested in obtaining information pertaining to the performance of financial security consistent with a dollar cost averaging strategy is often faced with the problem of either making the investment decisions based on insufficient information available from prior art methods, or is forced to undertake the daunting task of obtaining and analyzing large amounts of raw data, then understanding and applying a complex algorithm to analyze the data, and then perhaps setting up a complex spread-sheet to obtain the necessary information. Obviously, to the ordinary investor, this process is not only time-consuming and laborious, but is subject to errors.

Accordingly, there is a need for a computer-implemented system that will allow investors to interactively query and analyze the performance of securities, consistent with a long term investment such as a DCA approach, a need that is potentially common to millions of ordinary investors.

SUMMARY

In accordance with the present invention, there is provided a computer-implemented method for analyzing performance of financial securities consistent with a long-term investment strategy, the method utilizing a computer system having a computer processor programmed to electronically process data and display information, the processor being electronically connected to input and output devices and to computer networks, the method comprising the steps of:

providing said computer system;

obtaining and inputting into said computer system, application content variables comprising prices of securities and incomes from said securities, said securities being securities of interest for investment, said securities being identifiable by a security symbol;

inputting into said computer system, investment parameters comprising
 a security symbol of interest, said security symbol of interest being included in securities in said application content variables,
 investment amount in said security of interest,
 investment frequency,
 investment term, and
 performance duration time period pertaining to an investor's preference for analyzing said security's performance;

interactively utilizing said computer system, in conjunction with said investment
 parameters and said application content variables, calculate an internal rate of return for said security utilizing the formula:

$$MV = \Sigma A_i (1+R) T_i$$

where,
 MV=market value of an investment in said securities at the end of said performance duration time period, said market value being equal to the cumulative number of securities purchased multiplied by the price of said securities at the end of said performance duration time period,
 $A_i$=cash flows within said performance duration time period comprising investments, withdrawals, dividends and cost of investments including transaction costs, commissions and other expenses associated with said investments, $T_i$=a ratio of the total number of days in said performance duration time period that said cash flow $A_i$ has been in, or out of, a portfolio, and where $T_i$ is calculated from:

$T_i=(D-D_i)/D$ and where

D is the total number of days in said performance duration time period and $D_i$ is the number of days since the beginning of said performance duration time period in which said cash flow has occurred; and outputting on said output devices, investment and performance information comprising market value of said investment, time-weighted internal rate of return of said investment, cumulative investment amount and cumulative number of shares purchased at the end of said performance duration time period.

With the present invention, an investor is allowed to interactively analyze the performance of financial securities wherein the investor invests in a financial security over a period of time to realize the value of compounding and to reduce risk. The advantage of the present performance analysis approach over the prior art approaches which are all concerned with measuring performance based on a one-time investment strategy, can be seen in the example shown in Table 1. In this example, the rates of return for both approaches are measured by a computed Internal Rate of Return (IRR). The IRR is a time weighted measure of performance and is defined as the discount rate at which the net present value of all cash flows equal to zero.

As can be seen in Table 1, a one-time investment of $10,000 at the end of 1989 in Company A, based on the prior art approach, appreciates to a market value of $18,467 and yields an internal rate of return of 6.4% over a 10-year period from 1989–1999. By comparison, a $10,000 investment in Company A using a DCA approach wherein $1,000 annually is invested in Company A during the same period results in a market value of $21,495 and yields an internal rate of return of 13.7%. Hence, regarding the investment in Company A, if the investor had relied upon the prior art approach, instead of the DCA approach, the internal rate of return would have been understated by the wide margin of 7.3%.

TABLE 1

One-time investment Approach versus Dollar Cost Averaging Approach
Prior Art: One time Investment Approach (Invest $10,000 in Dec 1989)
Dollar Cost Average Approach (Investing $1,000/yr from 89–99)

Stock

| Company A | Prior Art | IRR: 6.40% | Market Value $18,467 |
|---|---|---|---|
| | DCA | IRR: 13.70% | Market Value $21,495 |
| | Difference | IRR: 7.30% | Market Value $3,028 |
| Company B | Prior Art | IRR: 43.70% | Market Value $367,580 |
| | DCA | IRR: 46% | Market Value $132,904 |
| | Difference | IRR: 2.30% | Market Value $234,6766 |

Similarly, regarding Company B, here the internal rate of return variance between the two approaches is only 2.3% but there is a striking $234,646 difference in the market value of the investment between the prior art and the DCA approach.

These findings reflect the importance of measuring financial performance consistent with the investors' investment strategy and to allow for the investor to make informed decisions with regard to stock selection, performance tracking and setting financial goals.

The present invention, which allows the investors to interactively query the performance of financial securities consistent with the DCA investment strategy, is available to investors on a standalone computer or through a computer network such as the Internet.

In the latter case, the invention is accessible through a company's web site that offers dividend reinvestment and or stock purchase plans; or on the web sites of stock transfer agents, or web sites that specialize in dollar cost averaging, or web portals that specialize in direct stock purchase, or web sites of mutual fund vendors, or web portals that provide equity research and personal finance tool links or brokerage, or other web sites that link to or incorporate the invention.

In summary, the method of the invention is as follows. Upon accessing the invention as embodied in a computer system, the investor is presented with a computer screen that prompts the investor to input the following information: security symbol, investment amount (initial amount, periodic amounts, reinvestment of dividends), investment frequency at which the investor will make investments in the security (daily, weekly, biweekly, monthly, quarterly, yearly), investment term, and performance duration.

The invention then takes the investment parameters and, in conjunction with the application content variables that include the price of the security and the income from the security, calculates the internal rate of return (IRR).

The internal rate of return is computed by solving for the value of "R" in the following equation:

$MV=A_i(1+R)T_i$ where,

MV=Market value of the investment at the end of the period (cumulative number of securities purchased x Price at the end of the period)

$A_i$=Cash flows within the period, which includes investments, withdrawals, income such as dividends and cost of investments such as transaction costs, commissions and other expenses.

$T_i$=is the portion of the total number of days in the period that cash flow $A_i$ has been in (or out of) the portfolio. Where, $T_i$ is:

$T_i=(D-D_i)/D$ where D is the total number of days in the period and $D_i$ is the number of days since the beginning of the period in which the cash flow has occurred.

From this calculation, the time-weighted Internal Rate of Return for the security and the related performance information including the cumulative amount invested, cumulative number of securities purchased, and the market value of the investment at the end of the period are displayed to the investor.

Preferably, the process and the system of the invention is enhanced to include optional variables such as risk characteristics and additional features such as portfolio analysis, investment strategy analysis, modeling and forecasting requirements specific to an investor.

BRIEF DESCRIPTION OF FIGURES

FIG. 1 is a block diagram of the present method for analyzing performance of securities consistent with a long-term investment strategy.

FIG. 2 is a printout of a computer screen showing the inputs and output for the present method.

FIG. 4. is a printout of a computer screen showing a portfolio analysis based on the present method.

FIG. 5 is a block diagram of variations of a DCA strategy based on the Moving Average Price.

FIG. 6 is a block diagram of a variation of the DCA strategy known as Value Averaging.

FIG. 7 is a block diagram of the Modeling and Forecasting Module of the present method.

FIG. 8 is a printout of a computer screen showing Modeling and Forecasting data.

DETAILED DESCRIPTION

Figure 3:
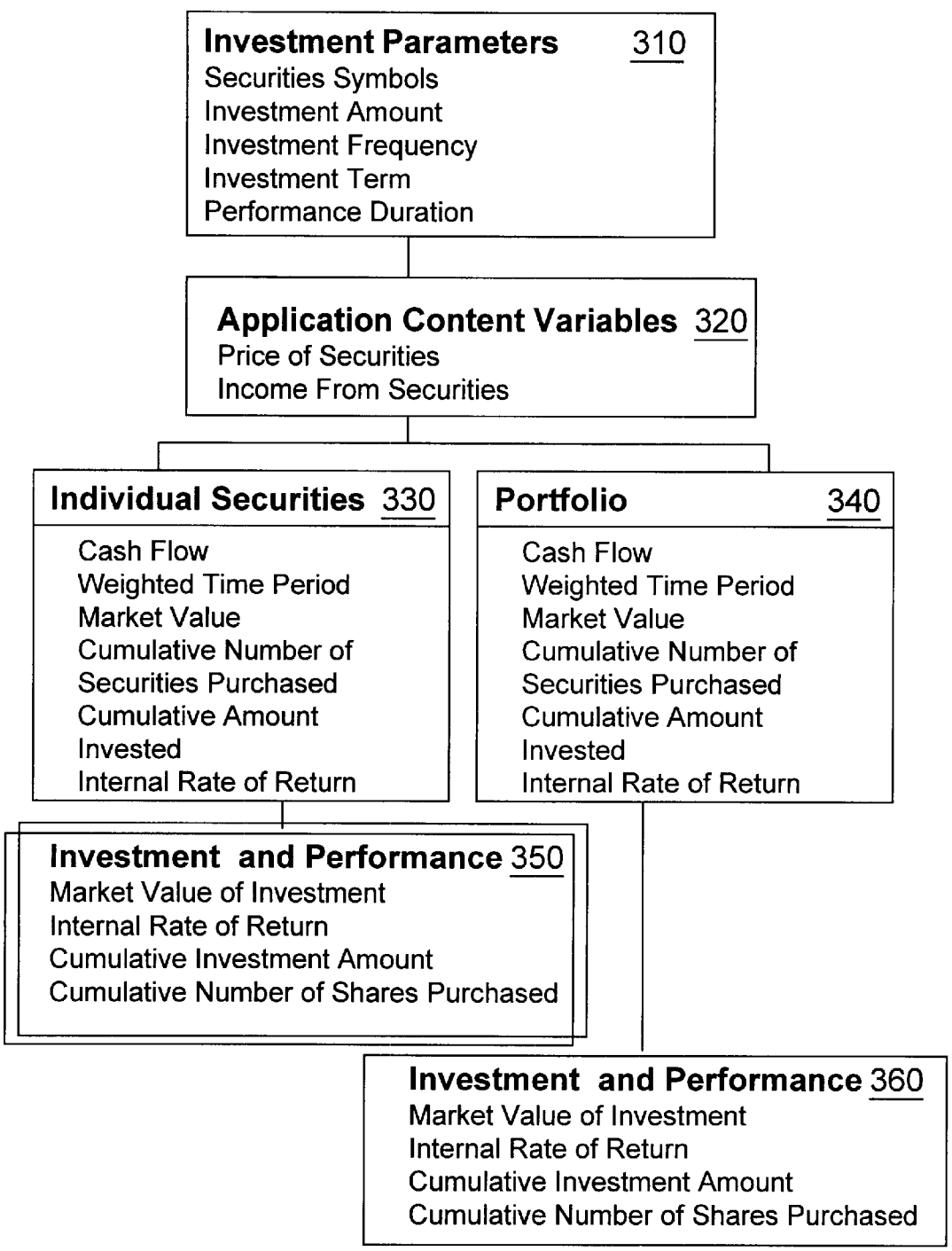
FIG. 3 is a block diagram of the portfolio analysis module of the present method.

The present invention is now described with reference to accompanying figures.

The present invention is a system and method for analyzing the performance of financial security consistent with a long term investment strategy.

In FIG. 1, there is shown a block diagram of the method of the invention as implemented on a computer 100 for analyzing the performance of stocks consistent with a long term investment such as a DCA strategy. In the initial step 110, the investor selects a security symbol and inputs the investment parameters including investment amount, investment frequency, term of investment, and performance duration as shown in Table 2. Examples of the investment parameters are shown in Table 3.

TABLE 2

| Investment Parameters | |
| --- | --- |
| Security Symbol: | Name of Security or Ticker Symbol |
| Investment Amount: | Initial Investment Amount, Periodic Investment, Reinvestment of Dividends |
| Investment Frequency: | Daily, weekly, biweekly, monthly, quarterly, yearly |
| Investment Term: | Investment Start Date and Investment End Date |
| Performance Duration: | Start Date and End Date |

TABLE 3

| Investment Parameters Example | |
| --- | --- |
| Security Symbol | ABC |
| Initial Amount | $500 |
| Periodic Investment Amount | $500 |
| Reinvestment of Dividends | Y |
| Investment Frequency | Quarterly |
| Investment Term | Start Date: 12/30/98 |
| | End Date: 12/30/99 |
| Performance Duration | Start Date: 12/30/98 |
| | End Date: 12/30/99 |

Next, the invention retrieves the application content variables 120 shown in Table 4. The price of security is time series pricing data such as open (first trade), high (highest price), low (lowest price), closing (last trading price) adjusted or average price on a daily, weekly, monthly, quarterly, yearly or at any predetermined interval basis. The income from the security includes dividends and interest income. An example of the information retrieved by the invention for a security with no dividends and in which an investment is made once a quarter is shown in Table 5.

TABLE 4

| Application Content Variables | |
| --- | --- |
| Price of Security | Time series Price Data. Example: Daily Closing Price |
| Income from Security | Dividends and Interest Income |

TABLE 5

| Example of Application Content Variables | | |
| --- | --- | --- |
| Date | Closing Price | Dividends |
| 12/30/98 | $17.90 | 0 |
| 3/30/99 | $18.75 | 0 |
| 6/30/99 | $21.94 | 0 |
| 9/30/99 | $25.94 | 0 |
| 12/30/99 | $26.50 | 0 |

Next, based on the investment parameters 110 and the application content variables 120, the application module 130 that resides on computer system computes the cumulative amount invested, cumulative number of securities purchased and the market value at the end of the period, cash flows within the period and the weighted time period values required to solve for the value of "R"-the Internal Rate of Return in the following equation:

$$MV = \Sigma A_i (1+R) T_i$$

where,

MV=Market value of the investment at the end of the period (cumulative number of securities purchased x Price at the end of the period)

$A_i$=Cash flows within the period, which includes investments, withdrawals, income such as dividends and cost of investments such as transaction costs, commissions and other expenses.

$T_i$=is the portion of the total number of days in the period that cash flow $A_i$ has been in (or out of) the portfolio. Where, $T_i$ is:

$$T_i = (D - D_i)/D$$

where D is the total number of days in the period and $D_i$ is the number of days since the beginning of the period in which the cash flow has occurred.

Examples of the computed values and the use of these variables in the above equation are shown in Table 5 and Table 6.

TABLE 5

Example of Computed Values

| Date | Closing Price (p) | Cash Flow ($A_i$) | Cum. Amt. Invest. | Cum. No. of Sec. | Weighted Time Period ($T_i$) | Market Value (MV) |
|---|---|---|---|---|---|---|
| Dec. 30, 1998 | $17.90 | $500 | $ 500 | 27.93 | 1 | $ 500 |
| Mar. 30, 1999 | $18.75 | $500 | $1000 | 54.60 | .75068 | $1,024 |
| Jun. 30, 1999 | $21.94 | $500 | $1500 | 77.61 | .49863 | $1,686 |
| Sep. 30, 1999 | $25.94 | $500 | $2000 | 96.89 | .24657 | $2,513 |
| Dec. 30, 1999 | $26.50 | $500 | $2500 | 115.76 | 0 | $3,067 |

TABLE 6

Use of Cash Flow and Computed Values $$\$3,066 = 500(1 + R)^1 + 500(1 + R)^{.7507} + 500(1 + R)^{.4986} + 500(1 + R)^{.2466} + 500(1 + R)^0$$

Next, the investment performance variables 140, which include the cumulative amount invested, the market value of investment, the cumulative number of securities purchased and the internal rate of return, are displayed to the investor. Key investment performance variables are outlined in Table 7. Examples of the investment and performance results are shown in Table 8.

TABLE 7

Investment and Performance Results

Cumulative Amount Invested
Cumulative Number of Securities Purchased
Market Value of Investment at the end of the period
Internal Rate of Return

TABLE 8

Investment and Performance Results Example

| Cumulative Amount Invested | $2500 |
|---|---|
| Cumulative Number of Securities Purchased | 115.76 |
| Market Value of Investment at the end of the period | $3,067 |
| Internal Rate of Return | 47.62% |

TABLE 9

Optional Variables

| Variable Category | Optional Variable |
|---|---|
| Investment Parameter | Tax Bracket: Federal Income Tax Percentage and long-term capital gains tax Percentage |
| Investment Parameter | Transaction Type: Buy or Sell Security |
| Investment Parameter | Performance Benchmark: Allows the user to compare the selected security performance against the performance of either an index or a specific security. |
| Investment Parameter | Investment Goal: The Investor can input the desired IRR or Market Value requirement at the end of the period. |
| Application Content | Expenses: Trading commissions, marketing fees, etc. |
| Application Content | Moving Average Values: Time series 200 day and 50 day moving average data |
| Application Content | Supplemental Security Data: Security Specific Data such as business description, industry sector, etc. |

TABLE 9-continued

Optional Variables

| Variable Category | Optional Variable |
|---|---|
| Investment and Performance | Income Return: IRR of the income from the security |
| Investment and Performance | Average Cost Per Security |
| Investment and Performance | Net Performance: Market Value and IRR statistics after expenses or tax considerations |
| Investment and Performance | Comparison Statistics: Investment performance variables comparison between the security and selected performance benchmark variable |
| Investment and Performance | Risk Characteristics: Standard Deviation and Sharp Ratio. Sharp Ratio "S" is computed using the formula: S = (Security Performance-Rf)/Standard Deviation, where Rf is the risk free rate of interest such as that from a U.S. Treasury Bill. |

The process and method described to analyze a single security is enhanced and used to provide the investor a comprehensive set of investment analysis tools. These tools are classified into four modules: Portfolio Analysis Module, Investment Strategy Module, Modeling and Forecasting Module, and Screening Module.

Portfolio Analysis Module

FIG. 3 represents the block diagram of the Portfolio Analysis Module 300. In the preliminary step 310, the investor establishes a portfolio containing one or more securities symbols and the investment parameters including the initial amount, frequency of investment, term of investment and performance duration for each of the securities. Based on the investment parameters, the invention generates relevant dates and retrieves the corresponding application content variables: price of the security and income from the security 320. Next, based on the investment parameters and application content variables, the invention computes the cash flows within the period, the weighted time period, the market value at the end of the period, cumulative amount invested, cumulative number of shares purchased and the internal rate of return for the individual securities 330 and for the portfolio 340.

Next, the invention provides the investor details about the investment and performance for individual securities 350 and for that of the portfolio 360. The sample output portfolio analysis generated by the invention is shown in FIG. 4.

Investment Strategies Module

The Investment Strategy Module 500 allows the investor to analyze variations of the standard DCA strategy. FIG. 5 discusses a variation of the DCA strategy based on an Moving Average Price. FIG. 6 discusses a variation of the DCA Strategy known as Value Averaging.

In the Moving Average Price strategy the investor initially inputs the investment parameters 510. In addition to the investment parameters such as security symbol, investment amounts, investment frequency, investment term and performance duration, the investor provides an investment adjustment factor. This factor reflects the percentage by which the periodic investment amount needs to be adjusted upwards or downwards based on the 200-day moving average price. For example, if the price of the security on the investment date is 20% below the 200-day Moving Average price, the periodic investment amount is increased by 20%. Conversely, if the price of the security on the investment date is 20% above the 200-day Moving Average price, the periodic investment amount is decreased by 20%.

Next, based on the investment parameters, the invention generates relevant dates and retrieves the corresponding application content variables: price of the security, income from the security, and the 200-day moving average price for the security 520.

Next, the invention compares for each of the dates during the term of the investment the security price differential between the 200-day moving average price and price of the security on the investment date 530 and the adjusts the periodic investment amount 540 based on the adjustment factor specified in the investment parameters.

Next, the invention computes the cash flow during the period, the weighted time period, the cumulative number of shares purchased during the period, the market value during the period and the internal rate of return for the 200-day moving average strategy 550.

Further, the invention as shown in block 560 computes the cash flow during the period, the weighted time period, the cumulative number of shares purchased during the period, the market value during the period and the internal rate of return for the DCA strategy.

Finally, the investments and performance resulting for both the moving average strategy and the DCA strategy are displayed to the investor.

Another variation of the DCA strategy is known as "Value Averaging". In a Value Averaging strategy, investors vary their investment amounts in relation to their investment goals. An example of the Value Averaging strategy is shown in Table 10. In this example, the investor wants the market value of the investment to increase by $500 every quarter from Dec. 30, 1998 to Dec. 30, 1999. On Dec. 30, 1998 the price of the security is $17.90. To reach the desired market value of $500 the investors needs 27.93 shares. Since on that day the investor does not own any shares of the security, the investor invests $500 to purchases 27.93 securities at the price of $17.90. On the next investment date Mar. 30, 1999, to reach the market value of $1,000, the investor invests needs 53.33 shares. At this juncture since the investors already owns 27.93 shares of the security, the investor invests $476 to purchase 25.4 shares at $18.75. Continuing the process forward the investor makes a cumulative investment of $1,989 between Dec. 30, 1998 and De. 30, 99. The market value of the investment is $2,500 and the internal rate of return is 49.7%. Comparison of the Value Averaging results and the standard DCA example shown in Table 8 illustrates that the Value Averaging exceeds DCA by 2.1%.

TABLE 10

Value Averaging Example

| Date | Price of Security | Desired Mkt. Value | No. of Shares. | Shares Req'd | Sec. Bought on hand or Sold | Investment Amount |
| --- | --- | --- | --- | --- | --- | --- |
| Dec. 30, 1998 | $17.90 | $ 500 | 27.93 | 0 | 27.93 | $ 500 |
| Mar. 30, 1999 | $18.75 | $1,000 | 53.33 | 27.93 | 25.40 | $ 476 |
| Jun. 30, 1999 | $21.94 | $1,500 | 68.36 | 53.33 | 15.03 | $ 330 |
| Sep. 30, 1999 | $25.94 | $2,000 | 77.10 | 68.37 | 8.73 | $ 227 |
| Dec. 30, 1999 | $26.50 | $2,500 | 94.34 | 77.10 | 17.23 | $ 457 |
| Total | | $2,500 | | | | $1,989 |

IRR = 49.7%

In the Value Averaging strategy 600, the investor initially inputs the investment parameters: security symbol, investment frequency, investment term, performance duration and target market value increment 610. Next, based on the investment parameters, the invention generates relevant dates and retrieves the corresponding application content variables 620-price of the security and income from security. Next, the invention computes the desired market value by investment frequency, the number of shares required for the desired market value, and the cumulative number of shares on hand 630. Then the number of securities to be bought or sold is determined 640, Next, the periodic investment or withdrawal amount is computed 650, and other variables including the weighted time period, the cumulative number of securities purchased and the internal rate of return are calculated, and the Investment and Performance results 670 are displayed to the investor.

Modeling and Forecasting Module

The Modeling and Forecasting Module 700 allows the user to generate "what if" scenarios and use the tool for forecasting purposes. A block diagram of the module is shown in FIG. 7.

To begin, the investor specifies the investment parameters 710 including the security symbol, investment amount, investment frequency, investment term, and performance duration. Next, based on the investment parameters, the invention generates relevant dates and retrieves the corresponding application content variables 720-price of the security and income from the security. Next, the invention computes the market value of the investment at the end of the period, weighted time period, cumulative number of securities purchased, cumulative amount invested and the internal rate of return 730. Next the investment parameters 730 and the investment and performance 740 results are displayed. At this stage, the invention allows all the investment parameters with the exception of the security ticker to be changed. The investor can then either accept the results 760 or revise the investment parameters and review the updated results. The ability to vary the investment parameters allows the investor to quickly generate "what if" scenarios and use the system for modeling and forecasting purposes. A sample screen of the modeling and forecasting module is shown in FIG. 8.

Screening Module

Figure 9:
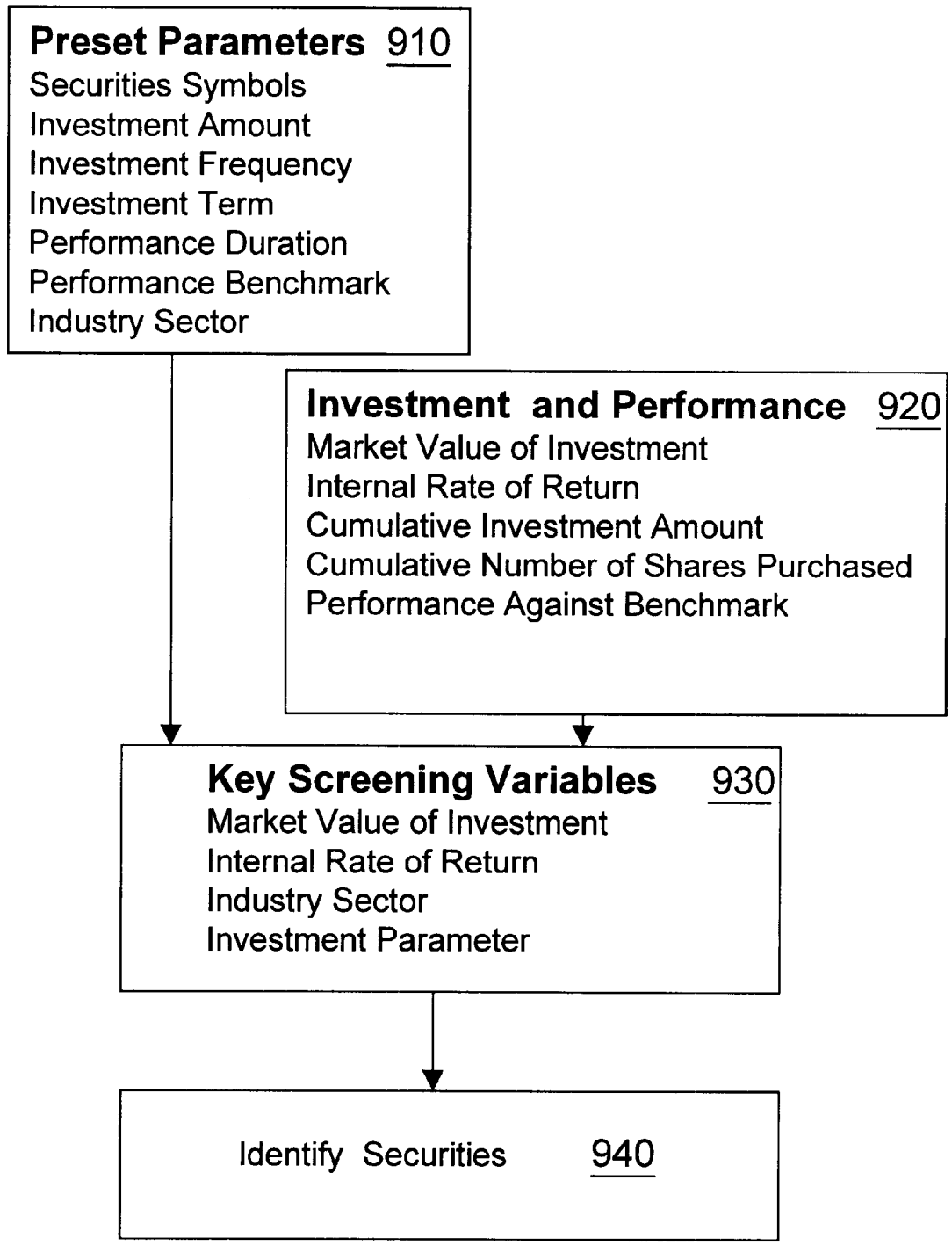
FIG. 9 is a block diagram of the Screening Module.

The Screening Module 900 allows the investor to compare multiple securities' performances and to identify securities using predefined screening variables. A block diagram of the screening module is shown in FIG. 9. As a preliminary, step the invention uses pre-set parameters for the variables specified in block 910 to generate the investment and performance results 920 for multiple securities. The investor can narrow the selection using the key screening variables 930, i.e. market value of investment, internal rate of return, industry sector or investment parameters such as investment amount, frequency of investment, and investment term. By selecting a value or range of values for one or more of the screening variables, the investor can narrow the selection and identify securities 940 that meet an investor's criteria.

Figure 10:
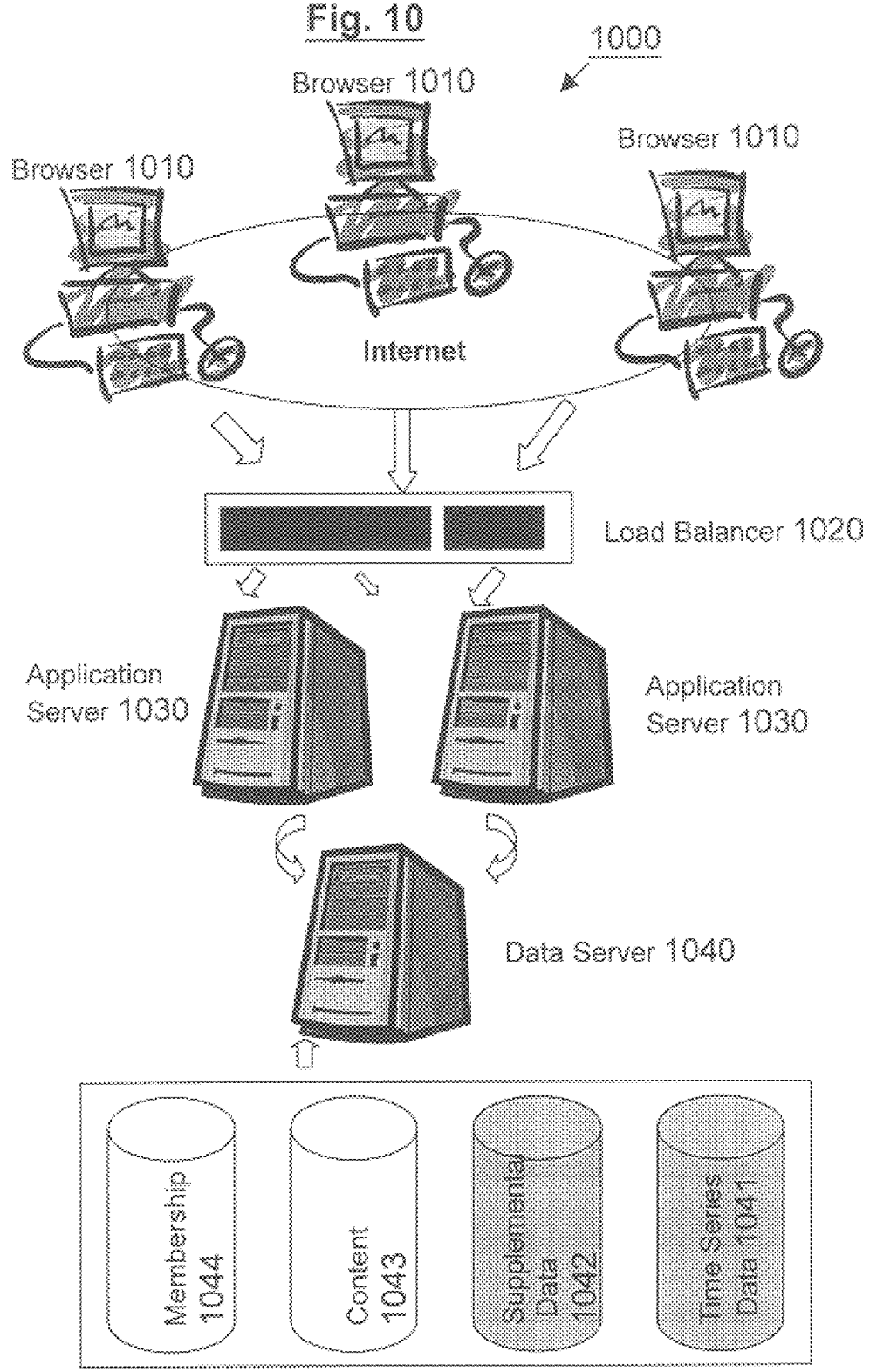
FIG. 10 is an overview of an implementation of the present method.

Having described the method of the invention and its features, an overview of the implementation of the invention in a computer system connected to the Internet 1000 is shown in FIG. 10. The four main components of the system are browsers 1010, load balancers 1020, application servers 1030 and data servers 1040. The users on the Internet interact with the invention using a web browser 1010 such as Microsoft Internet Explorer™ and Netscape Navigator™. The browser requests are distributed through the use of commercial Internet Protocol Load Balancers 120 such as CISCO LoadDirector™ making the system highly scalable and available.

The application servers 1030 execute browser requests and the application logic.

The application server houses the invention's computational logic and programs, and the web server software required to execute them. The data required for the invention resides in a data resource server(s) 1040. The data resource server houses critical application data and content required for the invention. Incorporating the data and content in the data resource server eliminates the need for duplicating the databases across multiple application servers and further enhances the system's scalability and reliability.

The key databases used in the invention are shown in block 1040. The time series database 1041 contains raw external data such as price and dividend history at daily, weekly, monthly or at pre-determined intervals. The non-time series information such as company business description, sector information and analysts' recommendations specific to the security is stored in the supplemental database 1042. The data from the time series database and supplemental databases is extracted, tested and converted into content and transferred into the content database 1043, which serves as the central data repository for all the information required for the invention. Finally, the user preferences and information are stored in the membership database 1044 and are used to deliver personalized financial analysis.

Figure 11:
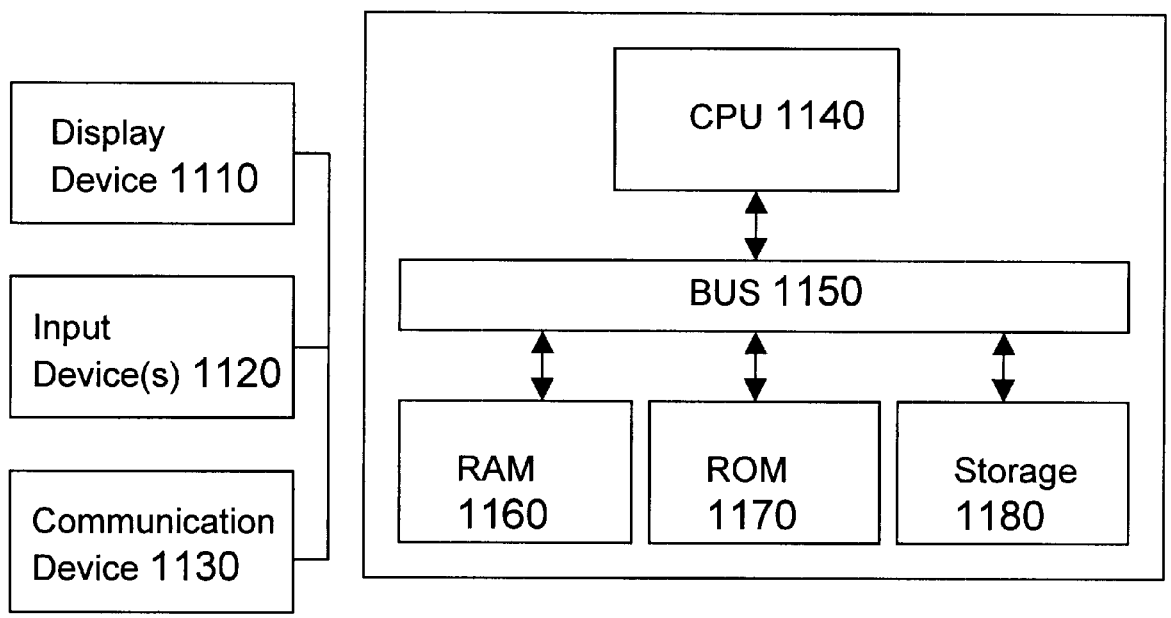
FIG. 11 is an overview of a computer system in which the present method is implemented.

An overview of an embodiment of the system architecture of a computer system 1100 in which features of the present invention is implemented as shown in FIG. 11. The computer system 1100 comprises a display device such as a monitor 1110, input devices 1120 such as keyboard and mouse, a communication device 1130 such as a modem, network cards such as Ethernet or Token Ring, CPU 1140, Communication Bus 1150, RAM 1160, ROM 1170 and data storage 1180. Persons skilled in th art may recognize other configurations that can be added to the embodiment described above.

What is claimed is:

1. A computer-implemented method for analyzing performance of financial securities consistent with a long-term investment strategy, the method utilizing a computer system having a computer processor programmed to electronically process data and display information, the processor being electronically connected to input and output devices and to computer networks, the method comprising the steps of:

providing said computer system, obtaining and inputting into said computer system, application content variables comprising prices of securities and incomes from said securities, said securities being securities of interest for investment, said securities being identifiable by a security symbol, inputting into said computer system, investment parameters comprising a security symbol of interest, said security symbol of interest being included in securities in said application content variables, investment amount in said security of interest, investment frequency, investment term, and performance duration time period pertaining to an investor's preference for analyzing security's performance, interactively utilizing said computer system, in conjunction with said investment parameters and said application content variables, calculate an internal rate of return for said security utilizing the formula:

$$MV = \Sigma A_i (1+R) T_i$$

where,

MV=market value of an investment in said securities at the end of said performance duration time period, said market value being equal to the cumulative number of securities purchased multiplied the price of said securities at the end of said performance duration time period, $A_i$=cash flows within said performance duration time period comprising investments, withdrawals, dividends and cost of investments including transaction costs, commissions and other expenses associated with said investments, $T_i$=a ratio of the total number of days in said performance duration time period that said cash flow $A_i$ has been in, or out of, a portfolio, and where $T_i$ is calculated from:

$$T_i = (D - D_i)/D \text{ and where}$$

D is the total number of days in said performance duration time period and $D_i$ is the number of days since the beginning of said performance duration time period in which said cash flow has occurred, and outputting on said output devices, investment and performance information comprising market value of said investment, time-weighted internal rate of return of said investment, cumulative investment amount and cumulative number of shares purchased at the end of said performance duration time period.

2. The method of claim 1, wherein the step of inputting investment parameters further includes inputting a risk characteristics of said securities of interest, and a transaction type identifier for said security of interest comprising a buy or sell instruction.

3. The method of claim 1, wherein the step of inputting application variables includes inputting transaction expenses, income tax rates and moving average values for said security of interest.

4. The method of claim 1, wherein the step of interactively utilizing said computer system includes utilizing said computer system to compute a Sharpe Ratio, a beta ratio and standard deviation for said security of interest.

5. The method of claim 1, wherein the step of outputting includes outputting an internal rate of return on the capital invested in said security of interest, an internal rate of return on the income from said security of interest, and the average cost of said security of interest.

6. The method of claim 1, wherein said step of providing said computer system includes providing a computer system interconnected to the Internet, wherein said computer system include means for facilitating Internet users to remotely input application content variables, and obtaining investment and performance information.

7. A computer program product comprising a computer useable medium having embedded therein a computer readable program code comprising a method for analyzing performance of financial securities consistent with a long-term investment strategy, the method utilizing a computer system having a computer processor programmed to electronically process data and display information, the processor being electronically connected to input and output devices and to computer networks, the method comprising the steps of:

providing said computer system, obtaining and inputting into said computer system, application content variables comprising prices of securities and incomes from said securities, said securities being securities of interest for investment, said securities being identifiable by a security symbol, inputting into said computer system, investment parameters comprising a security symbol of interest, said security symbol of interest being included in securities in said application content variables, investment amount in said security of interest, investment frequency, investment term, and performance duration time period pertaining to an investor's preference for analyzing security's performance, interactively utilizing said computer system, in conjunction with said investment parameters and said application content variables, calculate an internal rate of return for said security utilizing the formula:

$$MV = \Sigma A_i (1+R) T_i$$

where,

MV=market value of an investment in said securities at the end of said performance duration time period, said market value being equal to the cumulative number of securities purchased multiplied the price of said securities at the end of said performance duration time period, $A_i$=cash flows within said performance duration time period comprising investments, withdrawals, dividends and cost of investments including transaction costs, commissions and other expenses associated with said investments, $T_i$=a ratio of the total number of days in said performance duration time period that said cash flow $A_i$ has been in, or out of, a portfolio, and where $T_i$ is calculated from:

$$T_i = (D - D_i)/D \text{ and where}$$

D is the total number of days in said performance duration time period and $D_i$ is the number of days since the beginning of said performance duration time period in which said cash flow has occurred, and outputting on said output devices, investment and performance information comprising market value of said investment, time-weighted internal rate of return of said investment, cumulative investment amount and cumulative number of shares purchased at the end of said performance duration time period.

8. The computer program product of claim 7, including program code for facilitating said computer system being interconnected to the Internet, and wherein said computer system include means for facilitating Internet users to remotely input application content variables, and obtaining investment and performance information.

9. A computer system including a computer program product, said program product including a computer useable medium having embedded therein a computer readable program code comprising a method for analyzing performance of financial securities consistent with a long-term investment strategy, the method utilizing a computer system having a computer processor programmed to electronically process data and display information, the processor being electronically connected to input and output devices and to computer networks, the method comprising the steps of:

providing said computer system, obtaining and inputting into said computer system, application content variables comprising prices of securities and incomes from said securities, said securities being securities of interest for investment, said securities being identifiable by a security symbol, inputting into said computer system, investment parameters comprising a security symbol of interest, said security symbol of interest being included in securities in said application content variables, investment amount in said security of interest, investment frequency, investment term, and performance duration time period pertaining to an investor's preference for analyzing security's performance, interactively utilizing said computer system, in conjunction with said investment parameters and said application content variables, calculate an internal rate of return for said security utilizing the formula:

$$MV = \Sigma A_i (1+R) T_i$$

where,

MV=market value of an investment in said securities at the end of said performance duration time period, said market value being equal to the cumulative number of securities purchased multiplied the price of said securities at the end of said performance duration time period, $A_i$=cash flows within said performance duration time period comprising investments, withdrawals, dividends and cost of investments including transaction costs, commissions and other expenses associated with said investments, $T_i$=a ratio of the total number of days in said performance duration time period that said cash flow $A_i$ has been in, or out of, a portfolio, and where $T_i$ is calculated from:

$$T_i = (D - D_i)/D \text{ and where}$$

D is the total number of days in said performance duration time period and $D_i$ is the number of days since the beginning of said performance duration time period in which said cash flow has occurred, and outputting on said output devices, investment and performance information comprising market value of said investment, time-weighted internal rate of return of said investment, cumulative investment amount and cumulative number of shares purchased at the end of said performance duration time period.

10. The computer system of claim 9, including program code means for interconnecting said computer system to the Internet, thereby facilitating Internet users to remotely input application content variables, and obtaining investment and performance information.

* * * * *

UNITED STATES PATENT AND TRADEMARK OFFICE
CERTIFICATE OF CORRECTION

PATENT NO. : 6,564,191 B1 Page 1 of 1
DATED : May 13, 2003
INVENTOR(S) : Viveshwar N. Reddy It is certified that error appears in the above-identified patent and that said Letters Patent is hereby corrected as shown below:

Column 2,
Line 57, delete "$MV = \Sigma A_i (1+R)T_i$" and replace with -- $MV = \Sigma A_i(1+R)^{Ti}$ --.

Column 4,
Line 33, delete "$MV = A_i (1+R)T_i$" and replace with -- $MV = \Sigma A_i(1+R)^{Ti}$ --.

Column 6,
Line 40, delete "$MV = \Sigma A_i (1+R)T_i$" and replace with -- $MV = \Sigma A_i(1+R)^{Ti}$ --.
Lines 9 and 19, delete "Table 5" and replace with -- Table 5A --.
Lines 62 and 65, delete "Table 5" and replace with -- Table 5B --.

Column 7,
Line 19, delete "$\$3,066 = 500(1+R)^1 + 500(1+R).^{7507} + 500(1+R).^{4986}$" and replace with -- $\$3,066 = 500(1+R)^1 + 500(1+R)^{.7507} + 500(1+R)^{.4986}$ --.
Line 20, delete "$500(1+R).^{2466} + 500(1+R).^{0}$" and replace with -- $500(1+R)^{.2466} + 500(1+R)^{0}$ --.

Column 12,
Line 26, delete "$MV = \Sigma A_i (1+R)T_i$" and replace with -- $MV = \Sigma A_i(1+R)^{Ti}$ --.

Column 13,
Line 46, delete "$MV = \Sigma A_i (1+R)T_i$" and replace with -- $MV = \Sigma A_i(1+R)^{Ti}$ --.

Column 14,
Line 48, delete "$MV = \Sigma A_i (1+R)T_i$" and replace with -- $MV = \Sigma A_i(1+R)^{Ti}$ --.

Signed and Sealed this

Twenty-seventh Day of July, 2004

JON W. DUDAS
*Acting Director of the United States Patent and Trademark Office*